United States Patent
Kühne

(10) Patent No.: US 11,364,441 B2
(45) Date of Patent: Jun. 21, 2022

(54) METHOD FOR OPERATING AN ELECTRONIC DISPLAY DEVICE WEARABLE ON THE HEAD AND DISPLAY SYSTEM FOR DISPLAYING VIRTUAL CONTENT

(71) Applicant: AUDI AG, Ingolstadt (DE)

(72) Inventor: Marcus Kühne, Beilngries (DE)

(73) Assignee: AUDI AG, Ingolstadt (DE)

( * ) Notice: Subject to any disclaimer, the term of this patent is extended or adjusted under 35 U.S.C. 154(b) by 93 days.

(21) Appl. No.: 16/755,384

(22) PCT Filed: Sep. 12, 2018

(86) PCT No.: PCT/EP2018/074612
§ 371 (c)(1),
(2) Date: Apr. 10, 2020

(87) PCT Pub. No.: WO2019/072483
PCT Pub. Date: Apr. 18, 2019

(65) Prior Publication Data
US 2021/0205712 A1    Jul. 8, 2021

(30) Foreign Application Priority Data
Oct. 12, 2017   (DE) ..................... 10 2017 218 215.6

(51) Int. Cl.
*A63F 13/803*   (2014.01)
*A63F 13/213*   (2014.01)
(Continued)

(52) U.S. Cl.
CPC .......... *A63F 13/803* (2014.09); *A63F 13/213* (2014.09); *A63F 13/53* (2014.09);
(Continued)

(58) Field of Classification Search
USPC ............................................................ 463/1
See application file for complete search history.

(56) References Cited

U.S. PATENT DOCUMENTS 9,459,692 B1    10/2016   Li
2006/0015000 A1    1/2006   Kim
(Continued)

FOREIGN PATENT DOCUMENTS

CN    104216520 A    12/2014
CN    106228127 A    12/2016
(Continued)

OTHER PUBLICATIONS

International Search Report dated Dec. 7, 2018 in corresponding International Patent Application No. PCT/EP2018/074612.
(Continued)

*Primary Examiner* — Pierre E Elisca
(74) *Attorney, Agent, or Firm* — Staas & Halsey LLP

(57) ABSTRACT

Relative movement, in relation to a vehicle interior, of an electronic display device worn on the head is ascertained by an acquisition device arranged on the electronic display device. A virtual perspective of a wearer of the electronic display device, located in the vehicle interior, of displayed virtual content is adapted in accordance with the ascertained relative movement. In addition, a contour of the vehicle interior is acquired by the acquisition device and a virtual contour corresponding to the contour of the vehicle interior is displayed.

12 Claims, 1 Drawing Sheet

(51) Int. Cl.
  *A63F 13/53* (2014.01)
  *A63F 13/65* (2014.01)
  *G02B 27/01* (2006.01)

(52) U.S. Cl.
  CPC .......... *A63F 13/65* (2014.09); *G02B 27/0172* (2013.01); *G02B 27/0179* (2013.01); *A63F 2300/8082* (2013.01); *G02B 2027/014* (2013.01); *G02B 2027/0138* (2013.01)

(56) References Cited

U.S. PATENT DOCUMENTS

| | | | |
|---|---|---|---|
| 2013/0335301 A1 | 12/2013 | Wong et al. | |
| 2015/0325052 A1 | 11/2015 | Kuehne | |
| 2015/0378156 A1 | 12/2015 | Kuehne | |
| 2016/0070343 A1 | 3/2016 | Li | |
| 2016/0124502 A1 | 5/2016 | Sawyer et al. | |
| 2017/0061696 A1* | 3/2017 | Li | G02B 27/017 |
| 2017/0103574 A1 | 4/2017 | Faaborg et al. | |
| 2017/0278304 A1 | 9/2017 | Hildreth et al. | |
| 2018/0284969 A1* | 10/2018 | Welker | G06F 3/04815 |
| 2019/0189087 A1* | 6/2019 | Hélot | G06V 20/58 |
| 2019/0192967 A1* | 6/2019 | Ogasawara | A63F 13/25 |
| 2019/0333480 A1* | 10/2019 | Lang | G06F 3/011 |
| 2019/0380792 A1* | 12/2019 | Poltaretskyi | A61B 90/06 |
| 2020/0326831 A1* | 10/2020 | Marr | G06F 3/04815 |
| 2021/0192759 A1* | 6/2021 | Lang | A61B 34/10 |
| 2021/0199980 A1* | 7/2021 | Kühne | G06F 3/011 |

FOREIGN PATENT DOCUMENTS

| | | |
|---|---|---|
| CN | 106295581 A | 1/2017 |
| CN | 106484085 A | 3/2017 |
| CN | 106652345 A | 5/2017 |
| CN | 106873785 A | 6/2017 |
| CN | 108780357 A | 11/2018 |
| DE | 297 20 443 U1 | 3/1998 |
| DE | 10 2013 005 342 A1 | 9/2013 |
| DE | 10 2014 003 178 A1 | 9/2015 |
| DE | 10 2014 006 732 A1 | 11/2015 |
| DE | 10 2014 009 697 A1 | 12/2015 |
| DE | 10 2015 104 511 A1 | 3/2016 |
| DE | 10 2015 003 882 A1 | 9/2016 |
| DE | 10 2016 008 231 A1 | 2/2017 |
| DE | 102017218215.6 | 10/2017 |
| EP | 2 913 228 A1 | 9/2015 |
| EP | 3093751 A1 | 11/2016 |
| EP | 3 398 666 A1 | 11/2018 |
| JP | 2012-173772 | 9/2012 |
| JP | 2014-511512 | 5/2014 |
| JP | 2016-122392 | 7/2016 |
| JP | 2016-212769 | 12/2016 |
| JP | 2017-119031 A | 7/2017 |
| WO | 2012/082807 A2 | 6/2012 |
| WO | 2016/014877 A1 | 1/2016 |
| WO | PCT/EP2018/074612 | 9/2018 |

OTHER PUBLICATIONS

Office Action dated Jul. 23, 2018 in corresponding German Patent Application No. 10 2017 218 215.6.
English translation by WIPO of International Preliminary Report on Patentability dated Jan. 31, 2020 for International Application No. PCT/EP2018/074612, 6 pages.
Japanese Office Action dated May 25, 2021 from Japanese Application No. 2020-520566, 5 pages.
Chinese Office Action dated Jun. 16, 2021 from Chinese Application No. 201880065591.7.
Office Action dated Nov. 30, 2021 for Japanese Application No. 2020-520566.

* cited by examiner

METHOD FOR OPERATING AN ELECTRONIC DISPLAY DEVICE WEARABLE ON THE HEAD AND DISPLAY SYSTEM FOR DISPLAYING VIRTUAL CONTENT

CROSS REFERENCE TO RELATED APPLICATIONS

This application is a U.S. national stage of International Application No. PCT/EP2018/074612, filed on Sep. 12, 2018. The International Application claims the priority benefit of German Application No. 10 2017 218 215.6 filed on Oct. 12, 2017. Both the International Application and the German Application are incorporated by reference herein in their entirety.

BACKGROUND

Described below are a method for operating an electronic display device wearable on the head and a display system for displaying virtual content.

In future, it is expected that more and more people will use immersive technologies in their vehicles, whether for assistance when perceiving the driving task or also for entertainment and/or relaxation during travel. In this case, vehicle occupants are expected to use virtual-reality and/or augmented-reality technologies in order to play, consume media, or relax. In particular in the case of entertaining game experiences or interactions with other virtual or real persons also located in the vehicle, it is important that a respective user knows the physical boundaries of the vehicle surrounding him in reality. Since these boundaries can be very different depending on the vehicle type, providing such interior data beforehand represents a very high and costly expenditure.

The use of virtual-reality glasses in vehicles is disclosed, for example, in DE 10 2015 003 882 A1. The focus in this published application is to prevent so-called motion sickness in the wearer of the virtual-reality glasses. This is achieved in that, for example, by a camera system, the vehicle environment is acquired and additionally played in by the virtual-reality glasses.

US 2006/0015000 A1 also focuses on preventing so-called motion sickness. In the method proposed therein, it is provided that the vehicle environment is displayed by a display arranged in the rear seat region, so that rear seat passengers in the rear compartment do not become sick.

Finally, DE 10 2014 003 178 A1 also discloses a method for operating a pair of virtual-reality glasses during the travel with a vehicle. In this case, also displaying an image of a real vehicle environment in addition to the virtual content as such is provided.

SUMMARY

An aspect is to provide a method for operating an electronic display device wearable on the head and a display system for displaying virtual content, by which the awareness of physical limits within a vehicle can be indicated to wearers of such electronic display devices in a particularly simple manner.

In the method for operating an electronic display device wearable on the head, a relative movement of the electronic display device in relation to a vehicle interior of a vehicle is ascertained by an acquisition device arranged on the electronic display device and, in accordance with the ascertained relative movement, a virtual perspective of a wearer of the electronic display device located in the vehicle interior is adapted on a displayed virtual content. Moreover, a contour of the vehicle interior is acquired by the acquisition device and a virtual contour corresponding to the contour of the vehicle interior is displayed.

The acquisition device arranged on the electronic display device performs so-called inside-out tracking. In inside-out tracking, the acquisition of movements of the electronic display device is performed in that the acquisition device is attached to the electronic display device itself. The acquisition device is designed to acquire an environment of the electronic display device wearable on the head and thus to infer movements of the electronic display device in relation to the environment, in the specific application those with respect to the vehicle interior.

In this case, the acquisition device designed for the inside-out tracking is also additionally to be used to acquire the contour of the vehicle interior, wherein a virtual contour corresponding to the contour of the vehicle interior is displayed by the electronic display device wearable on the head. The acquisition device attached to the electronic display device makes it possible to recognize geometries and/or structures of the vehicle interior and to implement them within a respective virtual-reality or augmented-reality application by the electronic display device.

The virtual contour corresponding to the acquired contour of the vehicle interior does not have to appear precisely like the actual vehicle interior in this case. It is solely significant that the virtual contour corresponds with respect to its geometry to the acquired contour of the vehicle interior. In other words, it is thus possible by the method described herein that the vehicle environment of the wearer of the electronic display device, while he is seated in the vehicle interior, is displayed to the wearer as a type of structure or also relief by the electronic display device in addition to the virtual content already displayed as such.

Independently of the type of vehicle model in which the wearer of the electronic display device is thus presently seated, it is possible by the method described herein that the wearer of the electronic display device can recognize at any time, even when wearing the electronic display device, the physical boundaries of the vehicle actually surrounding him. Independently of whether he interacts via the electronic display device with other virtual persons or interacts with real persons also located in the vehicle, he can recognize the physical boundaries of the vehicle interior at any time—or at least if needed—in spite of wearing the electronic display device.

One advantageous embodiment provides that the virtual contour is permanently displayed. The wearer of the electronic display device thus recognizes at any time, in spite of wearing the electronic display device, how far away he is from the actual physical boundaries of the vehicle interior. It is thus possible, inter alia, to reliably prevent the wearer of the electronic display device from colliding with contours of the vehicle interior.

According to an alternative advantageous embodiment, it is provided that the virtual contour is first displayed when the wearer of the electronic display device falls below a predetermined distance to the contour of the vehicle interior with a predetermined body part. The predetermined body part can be, for example, a head and/or hands of the wearer of the electronic display device. In this alternative advantageous embodiment, in which the virtual contour is first displayed when the wearer of the electronic display device falls below the predetermined distance to the contour of the vehicle interior with the predetermined body part, a particularly immersive representation of the virtual content is assisted. As long as the wearer of the electronic display device is thus far enough away with the predetermined body part from the contour of the vehicle interior, the virtual contour, which corresponds geometrically to the acquired contour of the vehicle interior, is not displayed. However, as soon the wearer approaches too close to the real contour of the vehicle interior with the predetermined body part, the virtual contour which corresponds to the contour of the vehicle interior is displayed by the electronic display device. It can thus also be ensured that the wearer of the electronic display device does not collide with the real contour of the vehicle interior.

In a further advantageous aspect, the acquisition device includes a sensor device based on a runtime measurement, by which the contour of the vehicle interior is acquired. For example, a time-of-flight camera can be used as the sensor device based on the runtime measurement. It is possible in a particularly exact and reliable manner to acquire the real contour of the vehicle interior by the runtime measurement. As a result, the virtual contour can also be generated at least more or less 1 to 1 in accordance with the real contour of the vehicle interior and displayed by the electronic display device. It is thus possible to prevent the wearer of the electronic display device from colliding with the real contour of the vehicle interior in a particularly reliable manner. In other words, it is thus possible in a particularly exact manner by the runtime measurement to acquire the real contour of the vehicle interior, so that the wearer of the electronic display device can recognize at any time, with the electronic display device put on, how far away he is from the real contour of the vehicle interior, by the virtual contour being displayed—at least if needed.

A further advantageous embodiment provides that the acquisition device includes a camera, by which the vehicle interior is recorded and the contour of the vehicle interior is acquired based thereon. The advantage in the case of the use of a known camera is that it is typically substantially more cost-effective than, for example, a time-of-flight camera. The cost expenditure is thus substantially less if the camera is used alone. Alternatively, however, it is also possible to combine the runtime measurement and the known camera. It is thus possible if needed, for example, to actually also display the virtual contour as the vehicle interior appears in reality. This can be performed by a combination of the runtime measurement with the camera images. Three-dimensional data are generated by the runtime measurement, wherein the data relating to the actual optics are provided by the known camera.

A further advantageous embodiment provides that a game is displayed by the electronic display device and the virtual contour corresponding to the contour of the vehicle interior is adapted to a current scene of the game. If the wearer of the electronic display device stands on a bridge, for example, within the virtual environment displayed by the display device, a virtual terrain can thus be displayed, for example, which corresponds to the acquired contour of the vehicle interior, for example, that of a dashboard. The virtual terrain would thus correspond in this case to the virtual contour. Neglecting the geometry, the visual appearance of this virtual terrain can thus be adapted to the scene of the presently displayed game. Other virtual content, for example, media and the like, can also be displayed by the display device, wherein the virtual contour corresponding to the contour of the vehicle interior is displayed adapted to the respective virtual content. The immersion when displaying greatly varying content is thus assisted and/or substantially improved by the electronic display device.

The display system for displaying virtual content includes an electronic display device wearable on the head, an acquisition device arranged on the electronic display device, which is designed to ascertain a relative movement of the electronic display device in relation to a vehicle interior of a vehicle, and a control device, which is configured to adapt a virtual perspective of a wearer of the electronic display device located in the vehicle interior on the displayed virtual content in accordance with the ascertained relative movement. The acquisition device is moreover designed to acquire a contour of the vehicle interior, wherein the control device is configured to control the electronic display device to display a virtual contour corresponding to the contour of the vehicle interior. Advantageous aspects of the method are to be considered to be advantageous aspects of the display system and vice versa, wherein the display system is configured to carry out the method. The electronic display device can be, for example, a pair of virtual-reality glasses or also a pair of augmented-reality glasses.

BRIEF DESCRIPTION OF THE DRAWINGS

These and other aspects and advantages will become more apparent and more readily appreciated from the following description of the exemplary embodiments, taken in conjunction with the accompanying drawings of which.

Further advantages, features, and details will become more apparent and more readily appreciated from the following description of exemplary embodiments and on the basis of the drawings. The features and feature combinations mentioned above and hereafter in the description and/or shown solely in the drawings are usable not only in the particular specified combination, but rather also in other combinations or alone, without leaving the scope of the invention. In the drawings.

DETAILED DESCRIPTION

Reference will now be made in detail to the preferred embodiments, examples of which are illustrated in the accompanying drawings, wherein identical or functionally identical elements have been provided with identical reference signs.

Figure 1:
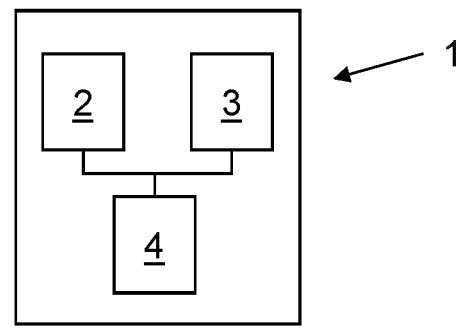
FIG. 1 is a schematic block diagram of a display system for displaying virtual content, the display system including an electronic display device wearable on the head, an acquisition device arranged on the electronic display device, and a control device.

A display system 1 for displaying virtual content is shown in a schematic illustration in FIG. 1. The display system 1 includes an electronic display device 2 wearable on the head, which can be, for example, a pair of virtual-reality glasses or also a pair of augmented-reality glasses. In addition, the display system 1 also includes an acquisition device 3 arranged on the electronic display device 2. The acquisition device 3 may be, for example, a time-of-flight camera, wherein the acquisition device 3 may alternatively or additionally also include, for example, a known camera. Moreover, the display system 1 also includes a controller 4, which has a data connection to the electronic display device 2 and the acquisition device 3.

Figure 2:
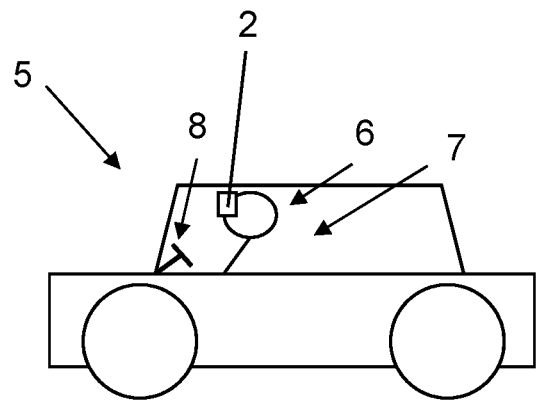
FIG. 2 is a schematic side view of a motor vehicle, in which a wearer of the electronic display device is seated.

A vehicle 5 is shown in a schematic side view in FIG. 2, wherein a wearer 6 has put on the electronic display device 2 during the travel with the vehicle 5. A relative movement of the electronic display device 2 in relation to a vehicle interior 7 of the vehicle 5 is ascertained by the acquisition device 3 (not shown in greater detail here), which is arranged on the electronic display device 2. A virtual perspective of the wearer 6 of the electronic display device 2 located in the vehicle interior 7 is adapted to virtual content 9 displayed by the electronic display device 2 in accordance with the ascertained relative movement. In other words, the acquisition device 3 is thus used for so-called inside-out tracking of the electronic display device 2.

Figure 3:
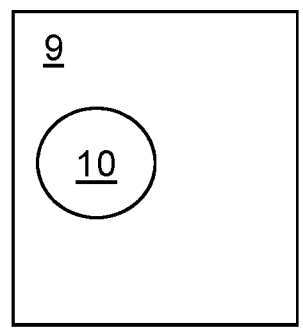
FIG. 3 is a schematic plan view of virtual content displayed by the electronic display device.

The virtual content 9 is shown very schematically in FIG. 3. Moreover, a contour 8, schematically indicated here by a steering wheel, of the vehicle interior 7 is acquired by the acquisition device 3, wherein a virtual contour 10 corresponding to the contour 8 of the vehicle interior 7 is displayed in addition to the actual virtual content 9.

It can be provided in this case that the virtual contour 10 is permanently displayed. Alternatively, however, it is also possible that the virtual contour 10 is first displayed when the wearer 6 of the electronic display device 2 has approached close enough, for example, with his head or also his hands to the real contour 8 of the vehicle interior 7. For example, a specific distance can be predetermined, wherein as soon as it is acquired that the distance has fallen below this distance to the real contour 8 of the vehicle interior 7, the virtual contour 10, which geometrically corresponds to the real contour 8 of the vehicle interior 7, is displayed. Independently of whether the virtual contour 10 is permanently displayed or is only displayed as needed, the virtual contour 10 corresponds with respect to its structure and/or with respect to its geometry and its dimensions to the real contour 8 of the vehicle interior 7. Otherwise, the overlaid virtual contour 10 does not have to appear solely optically like the real contour 8 of the vehicle interior 7, but rather, on the contrary, can also appear entirely different.

For example, it is possible that during the travel with the vehicle 5, a game is displayed by the electronic display device 2, wherein the game is displayed in the form of the virtual content 9. A virtual contour 10 corresponding to the real contour 8 of the vehicle interior 7 is adapted in this case to the present scene of the game. This thus means that the overlaid virtual contour 10 does not appear at all like the vehicle interior 7, but rather instead the virtual contour 10 solely corresponds with respect to the structure and/or the geometry to the real contour 8 of the vehicle interior 7, wherein the otherwise optical impression of the virtual contour 10 is adapted to the presently displayed and/or played game, which is displayed by the electronic display device 2.

By wearing the electronic display device 2, the wearer 6 can cause arbitrary virtual content to be displayed with the real contour 8 of the vehicle interior 7 indicated by overlay of the virtual contour 10 permanently, or as needed for the wearer 6, by the electronic display device 2.

The acquisition device 3 of the display system 1 thus receives a double functionality. Firstly, the acquisition device 3 is used to perform so-called positional tracking of the electronic display device 2 by way of the abovementioned inside-out tracking. Secondly, the acquisition device 3 additionally also assumes the function of acquiring the real contour 8 of the vehicle interior 7, so that the virtual contour 10, which corresponds to the contour 8 of the vehicle interior 7, can also be displayed in the described manner by the electronic display device 2.

The wearer 6 of the electronic display device 2 thus recognizes, in spite of wearing the electronic display device 2, at all times—at least if needed, i.e., with correspondingly strong approach—the physical boundaries of the vehicle 5 surrounding him. In addition to the actual acquisition of the real contour 8 of the vehicle interior 7, the acquisition device 3 may also acquire, for example, further vehicle occupants (not shown here), wherein it can also be provided in this context that the electronic display device 2 also displays virtual contours corresponding to the acquired vehicle occupants. In this case, it is even possible to prevent the wearer 6 of the electronic display device 2 from colliding not only with the real contour 8 of the vehicle interior 7, but rather also with other vehicle occupants when he has put on the electronic display device 2.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating an electronic display device wearable on a head of a user, comprising:
   ascertaining a relative movement of the electronic display device, configured as virtual-reality glasses, in relation to a vehicle interior of a vehicle by an acquisition device arranged on the electronic display device;
   adapting a virtual perspective of the user, located in the vehicle interior, of displayed virtual content in accordance with the relative movement;
   detecting a physical contour of the vehicle interior by the acquisition device; and
   displaying a virtual contour, corresponding to the physical contour of the vehicle interior, and a game by the electronic display device with the virtual contour adapted to a present scene of the game, the virtual contour being continually displayed during the game.

2. The method according to claim 1, wherein the acquisition device includes a sensor based on a runtime measurement configured to determine the contour of the vehicle interior around the user.

3. The method according to claim 2, wherein the sensor includes a time-of-flight camera.

4. The method according to claim 3, wherein the acquisition device includes
   a camera configured to obtain a record of the vehicle interior, and
   at least one processor configured to determine the physical contour of the vehicle interior based on the record of the vehicle interior.

5. The method according to claim 2, wherein the acquisition device further includes
   a camera configured to obtain a record of the vehicle interior, and
   at least one processor configured to determine the physical contour of the vehicle interior based on the record of the vehicle interior.

6. The method according to claim 1, wherein the acquisition device includes
   a camera configured to obtain a record of the vehicle interior, and
   at least one processor configured to determine the physical contour of the vehicle interior surrounding the user based on the record of the vehicle interior.

7. A display system for displaying virtual content to a viewer, having a head, in a vehicle interior of a vehicle, the display system comprising:
- virtual-reality glasses configured to provide an electronic display, wearable on the head of the viewer;
- an acquisition device, arranged on the electronic display, configured to ascertain a relative movement of the electronic display in relation to the vehicle interior and detect a physical contour of the vehicle interior; and
- a controller, coupled to the acquisition device and the virtual-reality glasses, configured to
  - adapt a virtual perspective, of the viewer of the electronic display, of displayed virtual content in accordance with the relative movement, and
  - control the electronic display to display a virtual contour, corresponding to the physical contour of the vehicle interior, and a game, the virtual contour corresponding to a present scene of the game and being continually displayed during the game.

8. The display system according to claim 7, wherein the acquisition device includes a sensor based on a runtime measurement configured to determine the contour of the vehicle interior around the viewer.

9. The display system according to claim 8, wherein the sensor includes a time-of-flight camera.

10. The display system according to claim 9, wherein the acquisition device further includes
- a camera configured to obtain a record of the vehicle interior, and
- at least one processor configured to determine the physical contour of the vehicle interior based on the record of the vehicle interior.

11. The display system according to claim 8, wherein the acquisition device further includes
- a camera configured to obtain a record of the vehicle interior, and
- at least one processor configured to determine the physical contour of the vehicle interior based on the record of the vehicle interior.

12. The display system according to claim 7, wherein the acquisition device includes
- a camera configured to obtain a record of the vehicle interior, and
- at least one processor configured to determine the physical contour of the vehicle interior surrounding the viewer based on the record of the vehicle interior.

* * * * *